(12) United States Patent
Kim et al.

(10) Patent No.: US 12,506,250 B2
(45) Date of Patent: Dec. 23, 2025

(54) PORTABLE INFORMATION HANDLING SYSTEM THERMAL MODULE ANTENNA SYSTEM

(71) Applicant: Dell Products L.P., Round Rock, TX (US)

(72) Inventors: Changsoo Kim, Cedar Park, TX (US); Chin-Ming Chang, Taiwan (TW); Ching-Wei Chang, Cedar Park, TX (US); Paul Lalinde, Spring, TX (US); Pomin Shih, Taipei (TW)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 18/228,745

(22) Filed: Aug. 1, 2023

(65) Prior Publication Data
US 2025/0046980 A1 Feb. 6, 2025

(51) Int. Cl.
*H01Q 1/22* (2006.01)
*G06F 1/20* (2006.01)
*H01Q 1/02* (2006.01)
*H05K 7/20* (2006.01)

(52) U.S. Cl.
CPC ........... *H01Q 1/2266* (2013.01); *G06F 1/203* (2013.01); *H01Q 1/02* (2013.01); *H05K 7/20154* (2013.01)

(58) Field of Classification Search
CPC ...... H01Q 1/02; H01Q 1/2258; H01Q 1/2266; H01Q 1/2275; G06F 1/20; G06F 1/203; G06F 1/206; H05K 7/20; H05K 7/20009–20209
See application file for complete search history.

(56) References Cited

U.S. PATENT DOCUMENTS

| | | | |
|---|---|---|---|
| 2014/0168893 A1* | 6/2014 | Niu | G06F 1/1698 361/692 |
| 2019/0097314 A1* | 3/2019 | Rajagopalan | H01Q 13/10 |
| 2021/0234250 A1* | 7/2021 | Migliorino | H01Q 9/42 |

* cited by examiner

*Primary Examiner* — Robert Karacsony
(74) *Attorney, Agent, or Firm* — Terrile, Cannatti & Chambers, LLP; Stephen A. Terrile

(57) ABSTRACT

A thermal module antenna system for a portable information handling system. The thermal module antenna system includes a thermal component, the thermal module performing an information handing system thermal operation; and, an antenna component thermally coupled to the thermal module, the antenna component, the antenna component performing an antenna operation and a thermal dissipation operation.

8 Claims, 22 Drawing Sheets

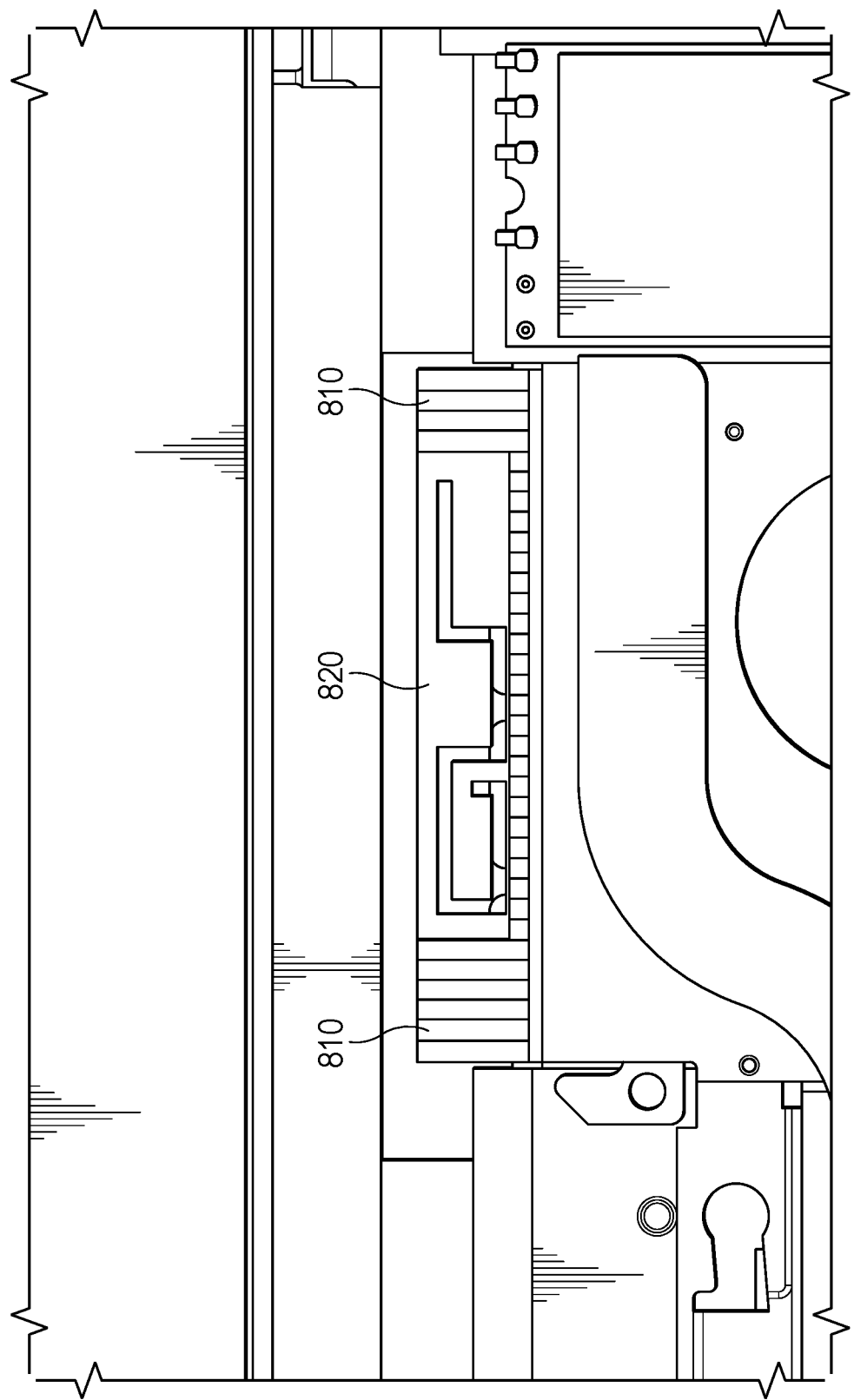

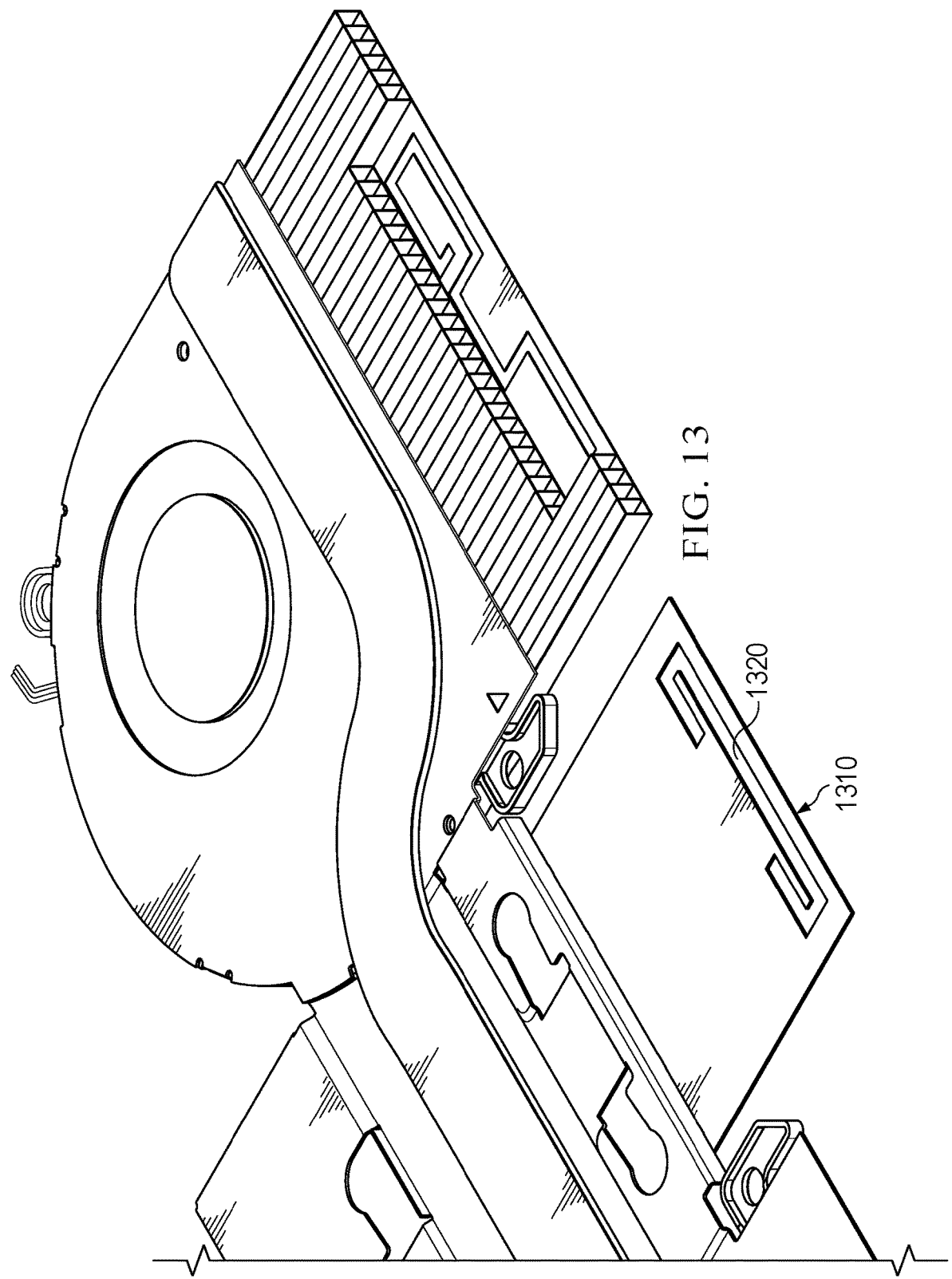

PORTABLE INFORMATION HANDLING SYSTEM THERMAL MODULE ANTENNA SYSTEM

BACKGROUND OF THE INVENTION

Field of the Invention

The present invention relates to information handling systems. More specifically, embodiments of the invention relate to a thermal module antenna system for a portable information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a thermal module antenna system for a portable information handling system, comprising: a thermal component, the thermal module performing an information handing system thermal operation; and, an antenna component thermally coupled to the thermal module, the antenna component, the antenna component performing an antenna operation and a thermal dissipation operation.

In another embodiment the invention relates to an information handling system comprising: a processor; a data bus coupled to the processor; and an information handling system chassis housing, the chassis housing comprising a base chassis, the base chassis comprising a thermal module antenna system for a portable information handling system, comprising: a thermal component, the thermal module performing an information handing system thermal operation; and, an antenna component thermally coupled to the thermal module, the antenna component, the antenna component performing an antenna operation and a thermal dissipation operation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 8 shows a bottom view of a thermal module antenna system.

FIG. 13 shows a top perspective view of a shielding cover used in combination with a thermal module antenna system of an information handling system.

DETAILED DESCRIPTION

Figure 1:
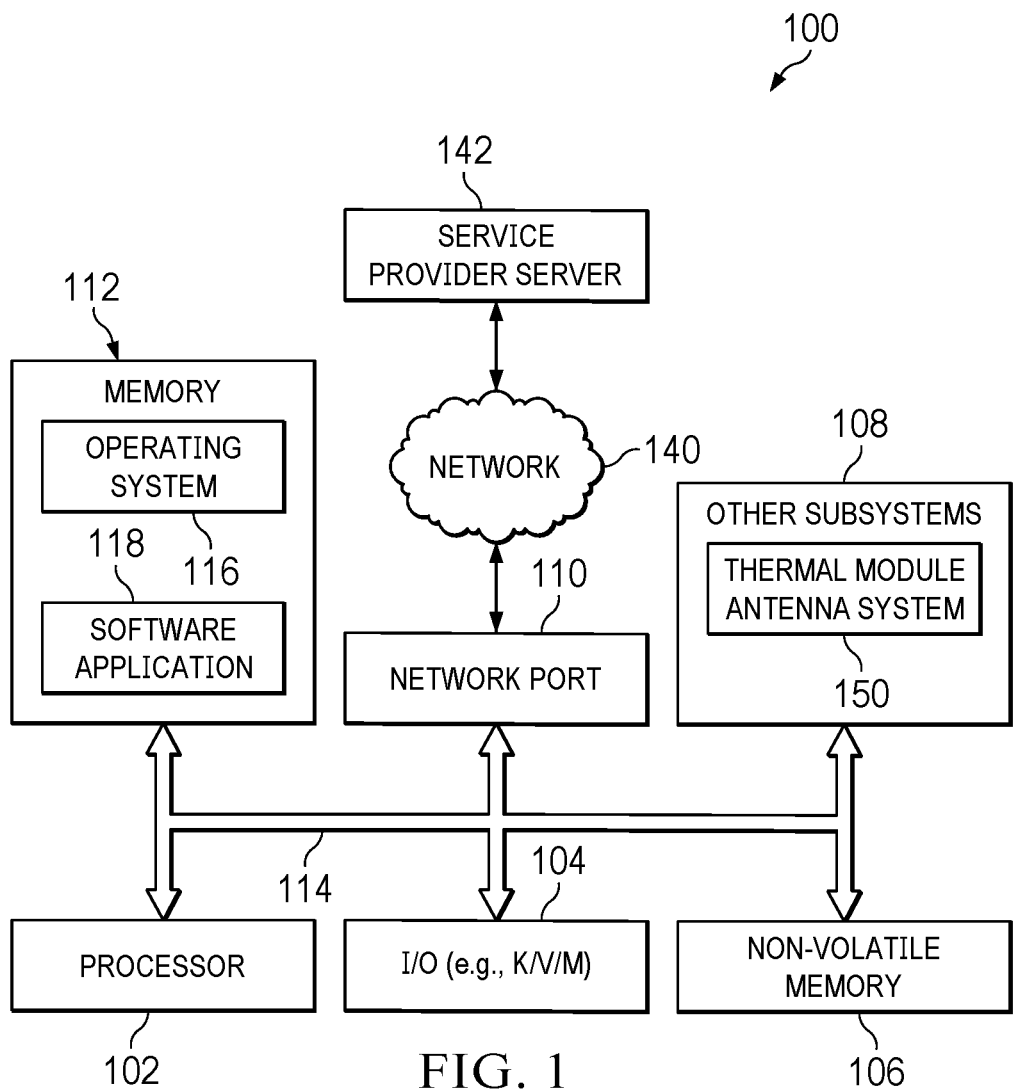
FIG. 1 shows a general illustration of components of an information handling system as implemented in the system and method of the present invention.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Various aspects of the present disclosure include an appreciation that portable information handling system antenna design is often challenged in premium devices pursuing a full metal chassis without any metal breaks or slots for antennas. With many known portable information handling system, antenna windows or slots are very easily noticeable from outside. In some instances, the industrial design of the portable information handling system is compromised further because additional processes are used to cover the window or open hole (slot) such as with mylar, mesh or painting process.

Additionally, various aspects of the present disclosure include an appreciation that with portable information handling systems such as narrow bezel and full metal A cover portable information handling systems, antenna design and heat management can be challenging. Often, with these types of portable information handling systems antennas are located in the base. Most of the area on the base for antennas can be easily blocked and interfered with by for example, a user's body like hand or palm. Accordingly, various aspects of the present disclosure include an appreciation that often the best location for the antennas is at the rear of the base of the portable information handling system such as between hinges because of limited interaction from the hands or body of a user.

However, this area is also often occupied by a thermal module and important for thermal solution such as heat spreading and thermal dissipation and ventilation. Because of the thermal module, in known systems an antenna cannot fully utilize this area because such a use may block hot air flow. In many known systems, antennas are positioned on the plastic carrier locally in this area which may interfere with ideal air flow through this section. Additionally, it is often desirable to provide thermal components such as a heat pipe and a thermal fin portion of the thermal module to have a metallic keepout to the edge or rear of the antenna for keepout as well. Such positioning of the antenna module and components the thermal module can cause degradation both to antenna and thermal performance.

Accordingly, various aspects of the present disclosure include an appreciation that an antenna solution requires collaboration between the antenna team, thermal team, industrial design team and mechanical team to develop an antenna solution that doesn't compromise the thermal performance or industrial design requirements of the portable information handling system.

Accordingly, a thermal module antenna solution is disclosed which integrates an antenna with a thermal module as one body thereby increasing the heat exchange efficiency of fins of the thermal module as well as meet requirements for antenna design to meet radiation efficiency. In certain embodiments, the heat exchange efficiency of the fins is further enhanced by extending the fins. In certain embodiments, the stiffness of the fins is increased (when compared with previous designs) to increase the heat exchange efficiency of the fins.

In certain embodiments, the thermal module antenna solution includes an antenna component which includes a planar type of antenna on the sheet metal over the FIN. In certain embodiments, the planar type antenna component increases the heat spreading effect of the thermal module. In certain embodiments, the sheet metal of the antenna component is extended to both sides of thermal module FIN to guide hot airflow, thus increasing the heat exchange efficiency of thermal module.

In certain embodiments, the thermal module antenna solution provides a multi-functional thermal antenna solution which includes a metal body to allow heat dissipation through a large metal surface area (original fins plus fin extension). In certain embodiments, the metal surface area includes the antenna component. In certain embodiments, the thermal module antenna solution facilitates cold air flow through the channel of fins thus bringing the heat out of the rear vent. In certain embodiments, the thermal module antenna solution uses the metal body extension to allow heat running and bring heat out of rear vent.

In certain embodiments, the extended fin section is used for antenna pattern design through irregular shaped openings for slot antenna concepts, etc. In certain embodiments, various antenna types can be used as part of the antenna component. In certain embodiments, side walls of the antenna component along with FINs guide hot air flow to bring heat out of the system and to extend the venting path to the edge of the device. Such a design advantageously reduces unnecessary disturbance in the air flow exiting system.

In certain embodiments, antenna cable routing is integrated within the thermal module antenna system. In certain embodiments, the thermal module antenna solution includes indentations to guide the cable, feed welding and reduce the Z-stacking after soldering. In certain embodiments, the thermal module antenna solution includes a slide fasten mechanism which allows tool-less attachment of the antenna component. In certain embodiments, the antenna component provides a thermal module subassembly (thermal-antenna) with more stiffness. In certain embodiments, increasing the stiffness of the thermal module antenna solution facilitates shipping of the information handling system.

In certain embodiments, such a thermal module antenna solution advantageously facilitates sustainability goals by eliminating a dedicated antenna count from the information handling system. In certain embodiments, providing a thermal module antenna solution with a uni-body construction provides better thermal conduction through the solution which brings better heat transfer and conduction and therefore leads to better thermal dissipation.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142. In certain embodiments, the other subsystems 108 include a thermal module antenna system 150.

In certain embodiments, the thermal module antenna system 150 integrates an antenna component with a thermal module as one body thereby increasing the heat exchange efficiency of fins of the thermal module antenna system 150 as well as satisfying requirements for antenna design to meet radiation efficiency. In certain embodiments, the heat exchange efficiency of the fins is further enhanced by extending the fins. In certain embodiments, the stiffness of the fins is increased (when compared with previous designs) to increase the heat exchange efficiency of the fins.

In certain embodiments, the thermal module antenna system 150 includes an antenna component which includes a planar type of antenna on the sheet metal over the FIN. In certain embodiments, the planar type antenna component increases the heat spreading effect of the thermal module. In certain embodiments, the sheet metal of the antenna component is extended to both sides of thermal module FIN to guide hot airflow, thus increasing the heat exchange efficiency of thermal module 150.

In certain embodiments, the thermal module antenna system 150 provides a multi-functional thermal antenna solution which includes a metal body to allow heat dissipation through a large metal surface area (original fins plus fin extension). In certain embodiments, the metal surface area includes the antenna component. In certain embodiments, the thermal module antenna system 150 facilitates cold air flow through the channel of fins thus bringing the heat out of the rear vent. In certain embodiments, the thermal module antenna system 150 uses the metal body extension to allow heat running and bring heat out of rear vent.

In certain embodiments, the extended fin section is used for antenna pattern design through irregular shaped openings for slot antenna concepts, etc. In certain embodiments, various antenna types can be used as part of the antenna component. In certain embodiments, side walls of the antenna component along with FINs guide hot air flow to bring heat out of the system and to extend the venting path to the edge of the device. Such a design advantageously reduces unnecessary disturbance in the air flow exiting system.

In certain embodiments, antenna cable routing is integrated within the thermal module antenna system. In certain embodiments, the thermal module antenna system 150 includes indentations to guide the cable, feed welding and reduce the Z-stacking after soldering. In certain embodiments, the thermal module antenna system 150 includes a slide fasten mechanism which allows tool-less attachment of the antenna component. In certain embodiments, the antenna component provides a thermal module subassembly (thermal-antenna) with more stiffness. In certain embodiments, increasing the stiffness of the thermal module antenna solution facilitates shipping of the information handling system.

In certain embodiments, such a thermal module antenna system 150 advantageously facilitates sustainability goals by eliminating a dedicated antenna count from the information handling system. In certain embodiments, providing a thermal module antenna system 150 with a uni-body construction provides better thermal conduction through the solution which brings better heat transfer and conduction and therefore leads to better thermal dissipation.

Figure 2:
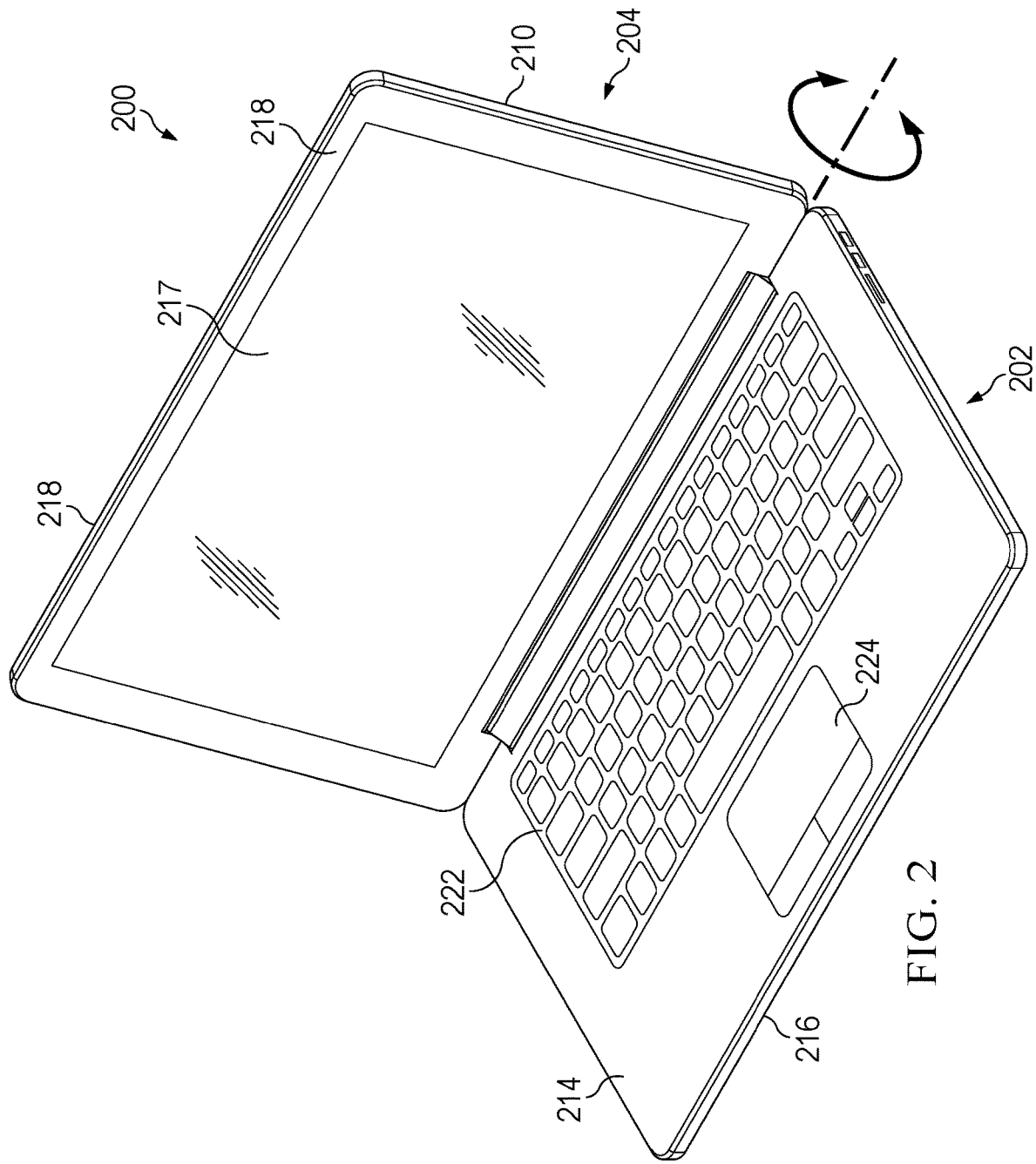
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 217 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 210 forms a top outer protective shell, or a portion of a lid, for the information handling system 200, while the D-cover 216 forms a bottom outer protective shell, or a portion of a base, for the information handling system. When in the fully closed configuration, the A-cover 210 and the D-cover 216 would be substantially parallel to one another.

In some embodiments, both the A-cover 210 and the D-cover 216 may be comprised entirely of metal. In some embodiments, the A-cover 210 and D-cover 216 may include both metallic and plastic components. For example, plastic components that are radio-frequency (RF) transparent may be used to form a portion of the C-cover 214.

In various embodiments, the display chassis 204 may be movably connected to a back edge of the base chassis 202 via one or more hinges. In this configuration, the hinges allow the display chassis 204 to rotate from and to the base chassis 202 allowing for multiple orientations of the information handling system 200. In some embodiments, the information handling system may be a laptop with limited rotation of the display chassis 2040 with regard to the base chassis 202, for example up to 140° rotation arc (+/−25%). In other embodiments the information handling system 200 may be a convertible information handling system with full rotation to a tablet configuration.

Figure 3:
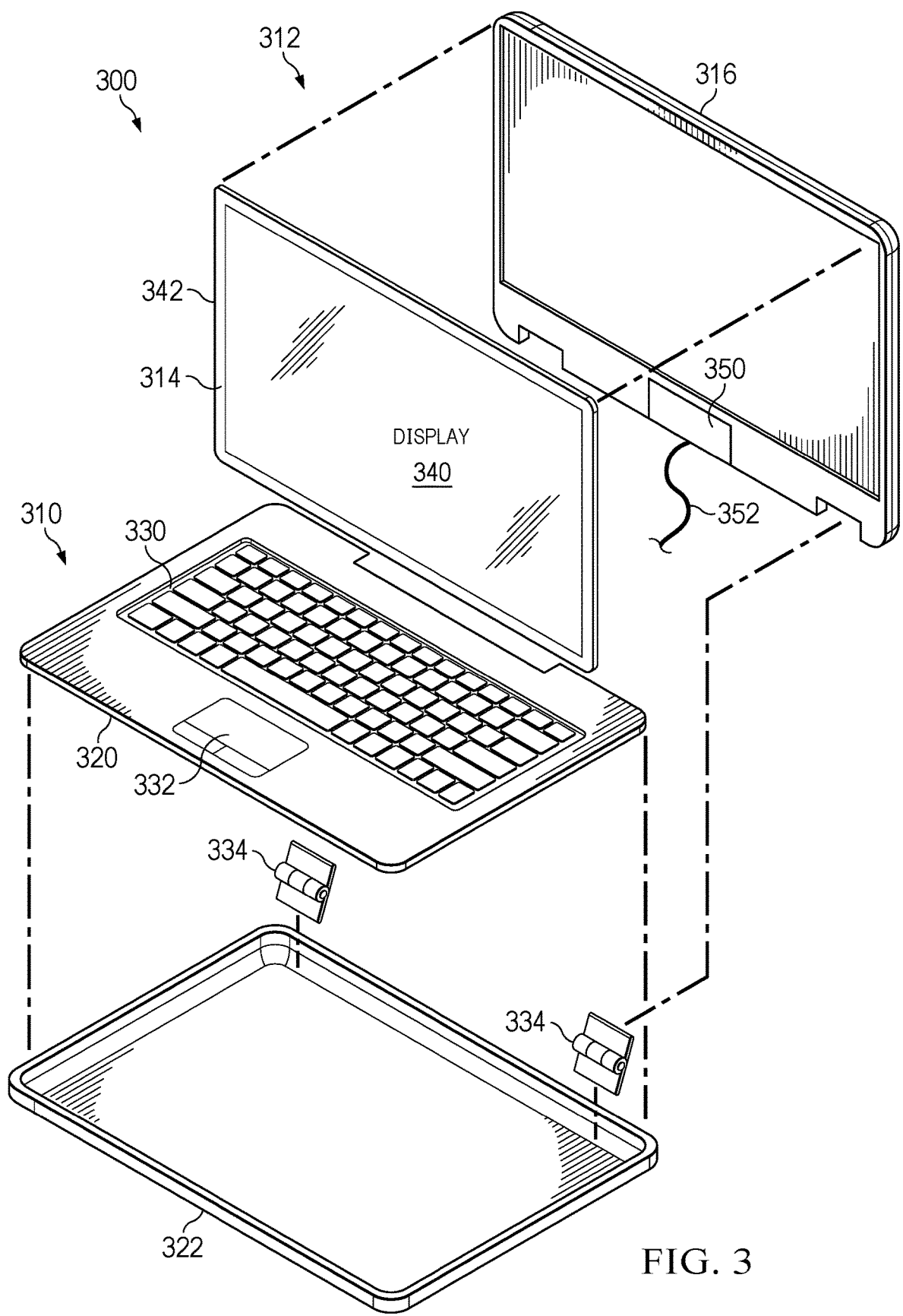
FIG. 3 shows a blown-up view of a portable information handling system.

FIG. 3 shows a blown-up view of a portable information handling system 300 having rotationally-coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 210) and a rear display cover portion 316 (which includes the A-Cover 212). The top cover portion 320 may include an integrated keyboard 330 or other I/O devices, such as a trackpad 332 or microphone (not shown). In various embodiments, the keyboard 330 may be mounted to the top of the C-Cover of the main housing portion 310. In various embodiments, the keyboard 330 may be mounted to the underside of the C-Cover of the main housing portion 310.

Lid housing portion 312 is rotationally coupled to main housing portion 310 via at least one hinge assembly 334. Lid housing portion 312 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 212 such that bezel may be narrow in size (e.g., less than 10 millimeters) on the edges. For example, display 340 is an infinity display with narrow bezels on the top and sides of lid housing portion 212 in the embodiment shown in FIG. 3. In certain embodiments, the side bezel is less than 4 mm (+/−10%) and the top bezel is less than 6 mm (+/−10%).

Lid housing portion 312 may also include timing controller (TCON) 350. Hinge assembly 334 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 312 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

Figure 4A:
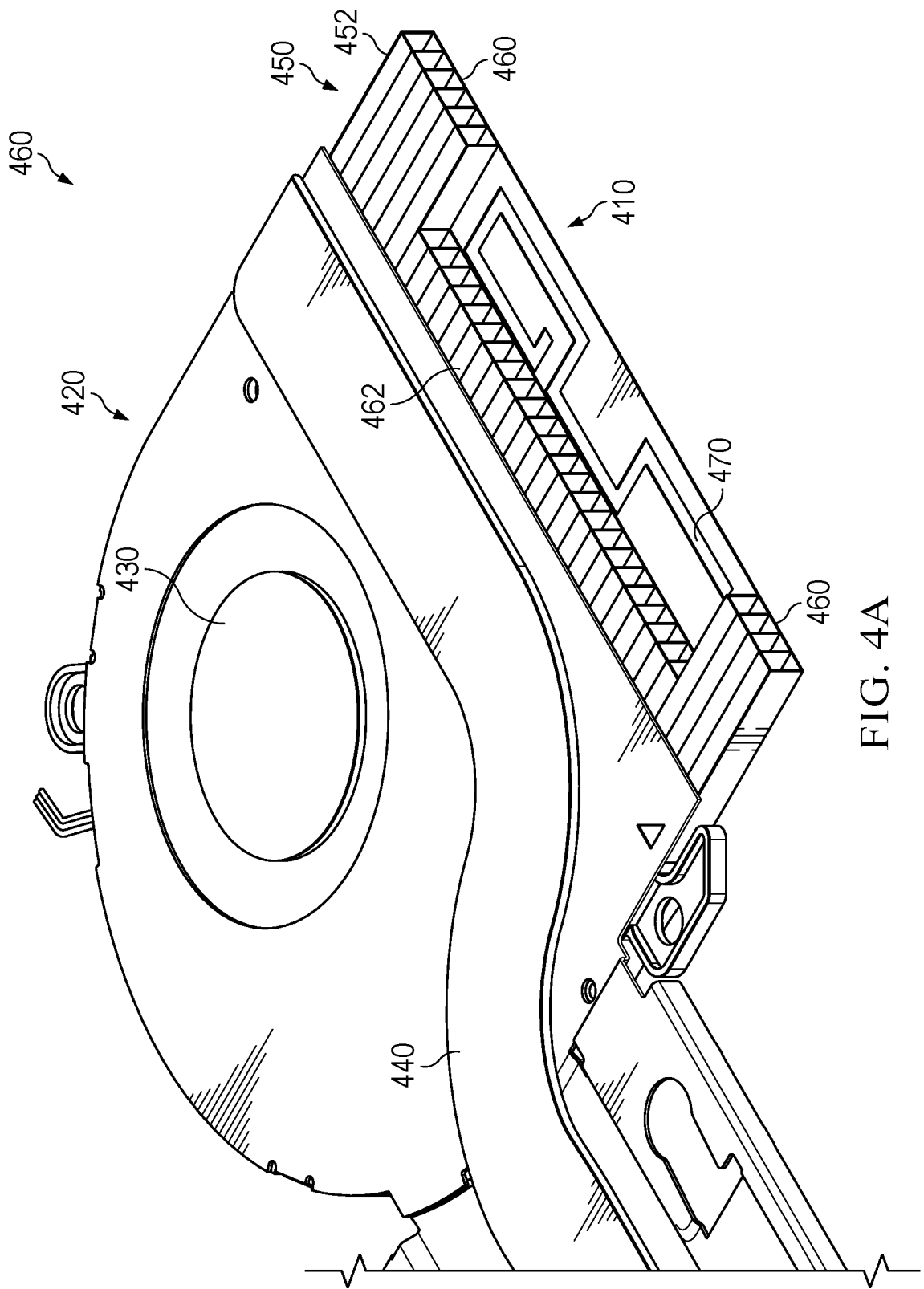
FIGS. 4A and 4B, generally referred to as FIG. 4, show top perspective views of a portion of a thermal module antenna system.
Figure 4B:
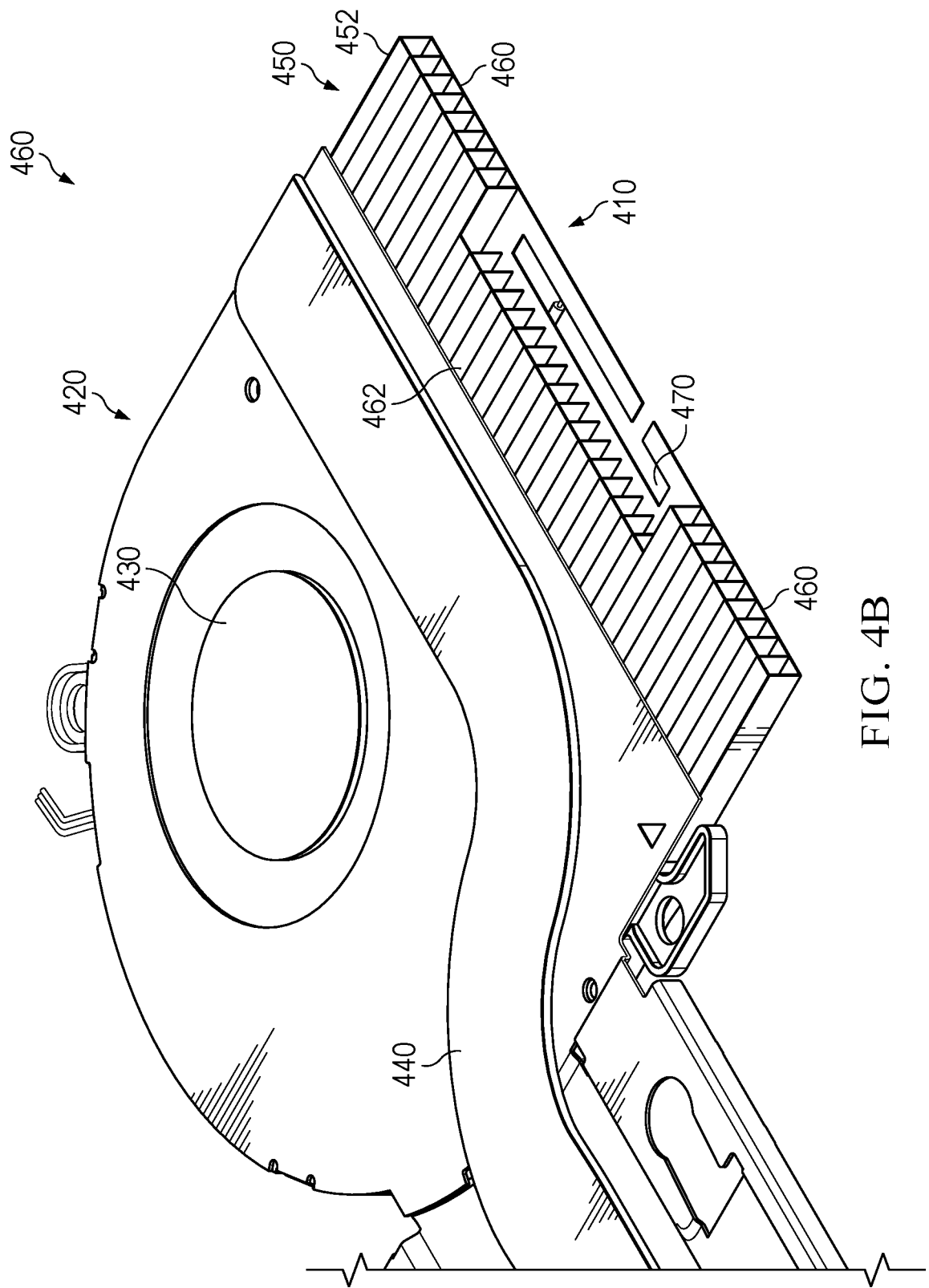
Figure 5A:
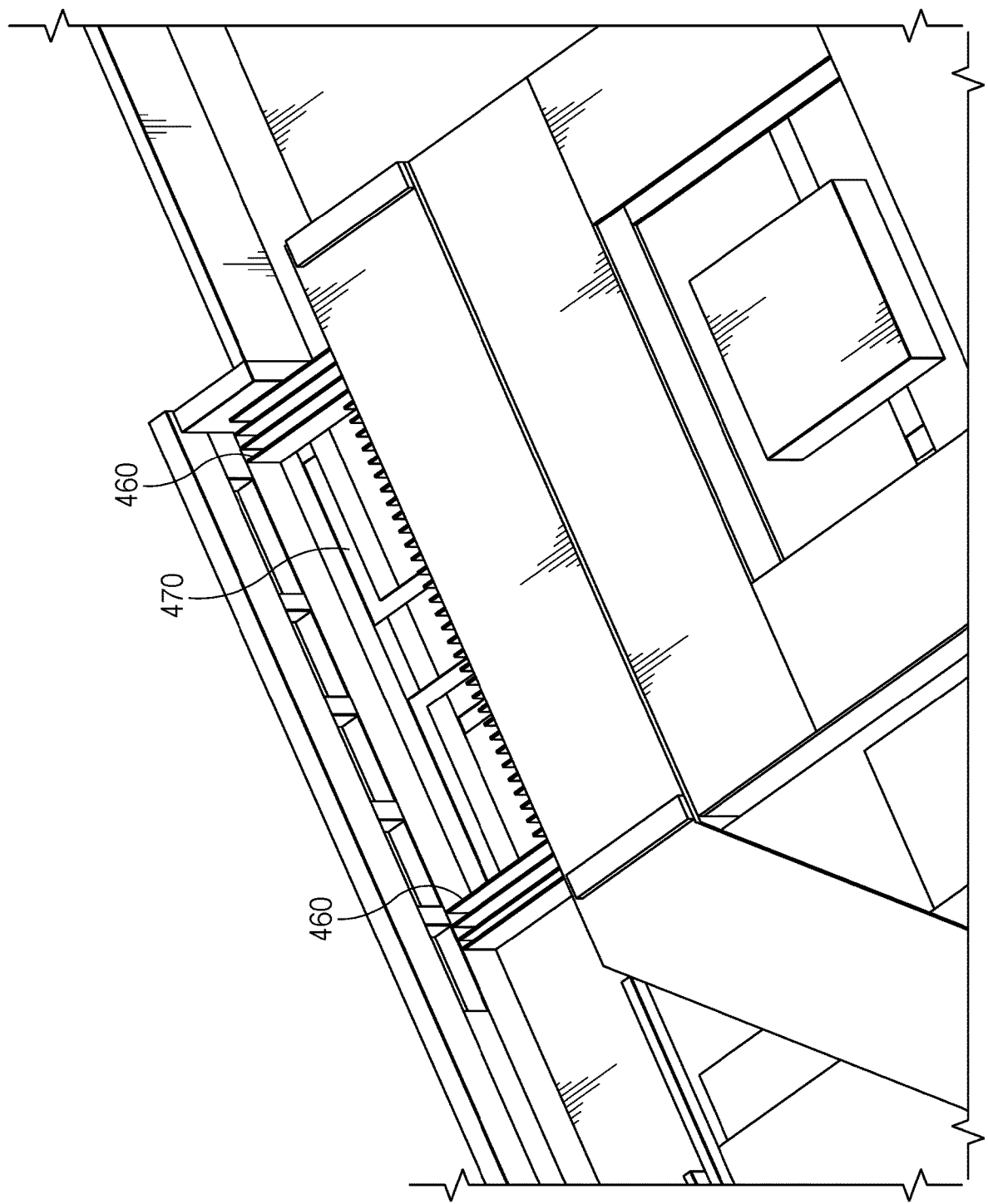
FIGS. 5A and 5B, generally referred to as FIG. 5, show a top perspective view of a portion of a main housing portion of a portable information handling system.
Figure 5B:
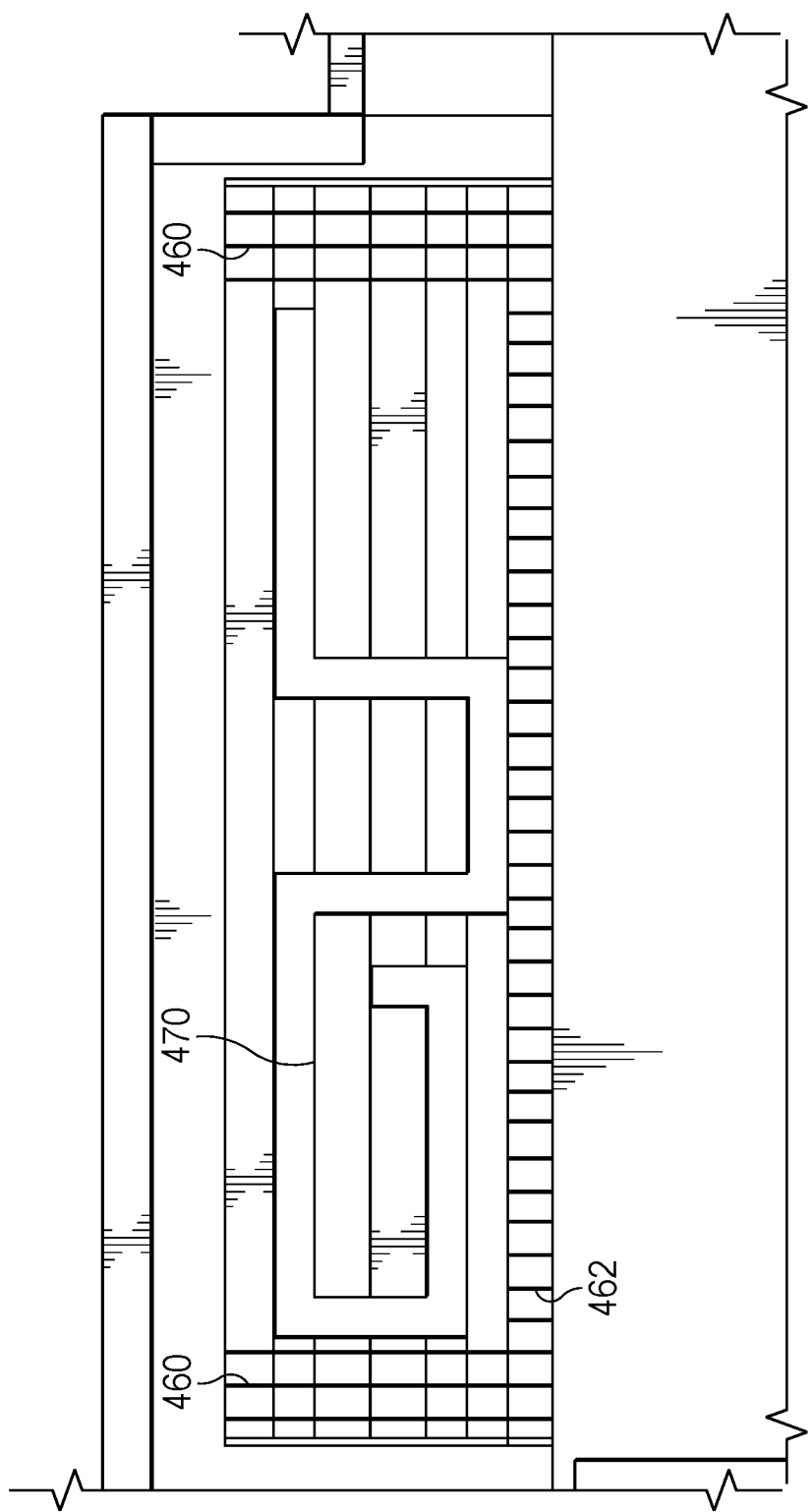

FIGS. 4A and 4B, generally referred to as FIG. 4, show top perspective views of a portion of a thermal module antenna system. FIG. 5 shows a top perspective view of a portion of a main housing portion of a portable information handling system.

In certain embodiments, the thermal module antenna system includes an antenna component 410 and a thermal component 420. In certain embodiments, the antenna component 410 performs an antenna operation. As used herein, an antenna operation broadly refers to any task, function, operation, procedure, or process performed, directly or indirectly, within an information handling system to transmit (i.e., radiate) energy as electromagnetic waves (i.e., radio waves), to intercept (i.e., receive) some of the power of a radio wave to produce an electric current representing the radio wave, or a combination thereof. In certain embodiments, the thermal component 420 performs an information handling system thermal operation. As used herein, an information handling system thermal operation broadly refers to any task, function, operation, procedure, or process performed, directly or indirectly, within an information handling system to remove waste heat produced by components of an information handling system so as to maintain operating temperature of the information handling system, the components of the information handling system, or a combination thereof, within permissible temperature limits. In certain embodiments, the antenna component performs a thermal dissipation operation. As used herein, a thermal dissipation operation broadly refers to any task, function, operation, procedure, or process performed, directly or indirectly, within an information handling system to dissipate heat removed by an information handling system thermal operation, heat produced by components of an information handling system, or a combination thereof so as to assist in maintaining operating temperature of the information handling system, the components of the information handling system, or a combination thereof, within permissible temperature limits.

In certain embodiments, the thermal module antenna system 400 integrates an antenna component 410 with a thermal component 420 as one body thereby increasing the heat exchange efficiency of fins of the thermal module antenna system as well as satisfying requirements for antenna design to meet radiation efficiency. In certain embodiments, the thermal component 420 includes a fan 430 and a heat pipe 440.

In certain embodiments, the thermal component 420 includes a thermal fin section 450. In certain embodiments, the thermal fin section 450 includes a plurality of thermal fins. In certain embodiments, the thermal fins perform a thermal transfer operation. As used herein, a thermal transfer operation broadly refers to any task, function, operation, procedure, or process performed, directly or indirectly, within an information handling system to increase a rate of heat transfer of heat removed by an information handling system thermal operation, heat produced by components of an information handling system, or a combination thereof so as to assist in maintaining operating temperature of the information handling system, the components of the information handling system, or a combination thereof, within permissible temperature limits. In certain embodiments, the thermal fins increase the rate of heat transfer by increasing the surface area via which the produced heat is transferred away from the components. In certain embodiments, air flow across the surface area of the thermal fins is increased to increase the rate of heat transfer. In certain embodiments, the air flow is increased by use of one or more fans. In certain embodiments, one or more heat pipes are used to direct the airflow across the surface areas of the thermal fins.

In certain embodiments, the thermal fin section 450 includes a plurality of thermal fins 452. In certain embodiments, the thermal fin section 450 is substantially (i.e., +/−20%) U-shaped. In certain embodiments, the thermal fin section 450 includes extended side thermal fin portions 460. In certain embodiments, the thermal fin section includes an indented middle fin portion 462. In certain embodiments, the heat exchange efficiency of the fins is further enhanced by extending the fins. In certain embodiments, the stiffness of the fins is increased (when compared with previous designs) to increase the heat exchange efficiency of the fins.

In certain embodiments, the antenna component extends across the extended side thermal fin portions 460. In certain embodiments, an antenna 470 fits within a rectangle defined on three sides by the extended side thermal fin portions 460 and the indented middle fin portion 462. In various embodiments, the antenna is positioned at any location across the width of the thermal fin portion 460 to optimize antenna and thermal performance. In certain embodiments, the antenna component 410 includes a planar type of antenna. In certain embodiments, the planar type of antenna includes one or more of a Slot antenna, a Loop antenna, a planar inverted F antenna (PIFA) antenna, a Wire type antenna (such as Monopole Wire type antenna, an inverted F antenna (IFA) antenna, or a combination thereof. For example, FIG. 4A shows the thermal module antenna system with a Slot type antenna and FIG. 4B shows the thermal module antenna system with an inverted F type antenna. In certain embodiments, the antenna is constructed from a piece of sheet metal. In certain embodiments, the antenna component 410 is positioned over the fin section 450. In certain embodiments, the planar type antenna component 410 increases the heat spreading effect of the thermal module. In certain embodiments, the sheet metal of the antenna component 410 is extended to both sides of thermal module FIN to guide hot airflow, thus increasing the heat exchange efficiency of thermal module 150.

In certain embodiments, the thermal module antenna system 150 provides a multi-functional thermal antenna solution which includes a metal body to allow heat dissipation through a large metal surface area (original fins plus fin extensions). In certain embodiments, the metal surface area includes the antenna component. In certain embodiments, the thermal module antenna system facilitates cold air flow through the channel of fins thus bringing the heat out of the rear vent. In certain embodiments, the thermal module antenna system uses the metal body extension to allow heat running and bring heat out of rear vent.

In certain embodiments, the extended fin section is used for antenna pattern design through irregular shaped openings for slot antenna concepts, etc. In certain embodiments, various antenna types can be used as part of the antenna component. In certain embodiments, side walls of the antenna component along with FINs guide hot air flow to bring heat out of the system and to extend the venting path to the edge of the device. Such a design advantageously reduces unnecessary disturbance in the air flow exiting system.

In certain embodiments, side walls of the antenna component along with FINs guide hot air flow to bring heat out of the system and to extend the venting path to the edge of the device. Such a design advantageously reduces unnecessary disturbance in the air flow exiting system.

In certain embodiments, such a thermal module antenna system 150 advantageously facilitates sustainability goals by eliminating a dedicated antenna count from the information handling system. In certain embodiments, providing a thermal module antenna system 150 with a uni-body construction provides better thermal conduction through the solution which brings better heat transfer and conduction and therefore leads to better thermal dissipation. As used herein, uni-body construction refers to providing a combination of functions within a single component. For example, combining an information handling system thermal operation and an antenna operation within a single component corresponding to the thermal module antenna system 150.

Figure 6:
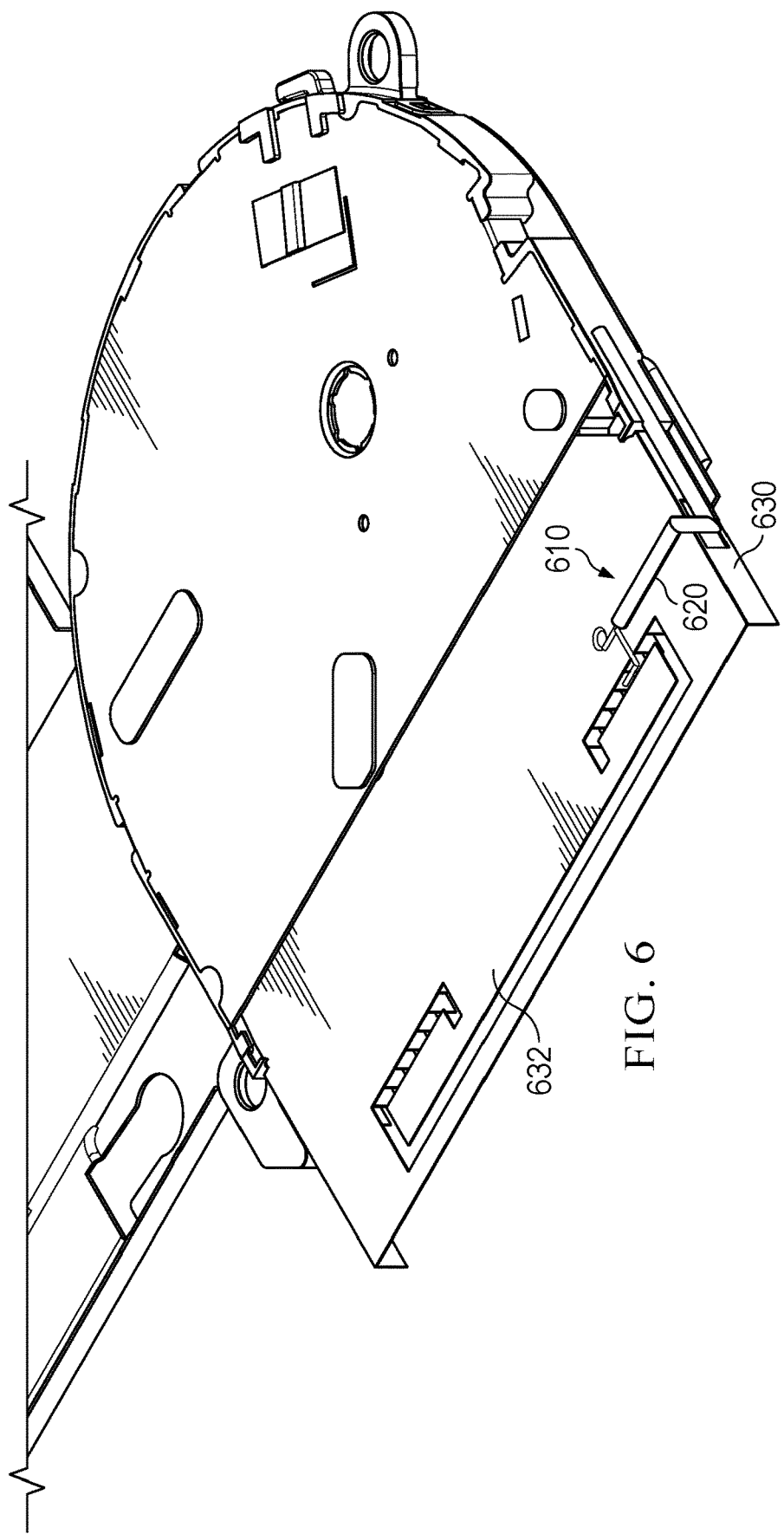
FIG. 6 shows a bottom perspective view of a portion of a thermal module antenna system.
Figure 7A:
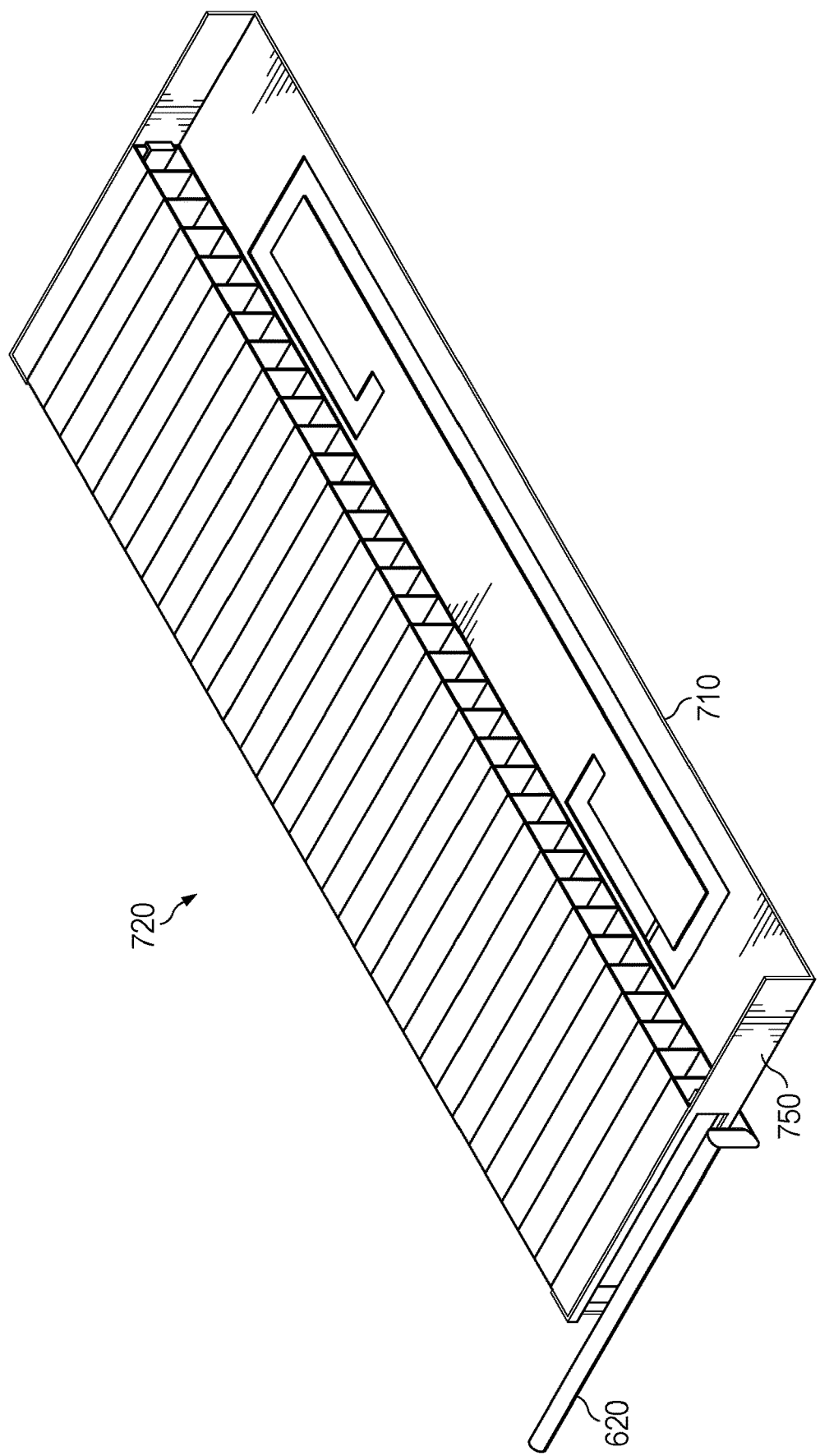
FIGS. 7A, 7B and 7C show views of an antenna component fastened to a thermal fin system of a thermal module antenna system.
Figure 7B:
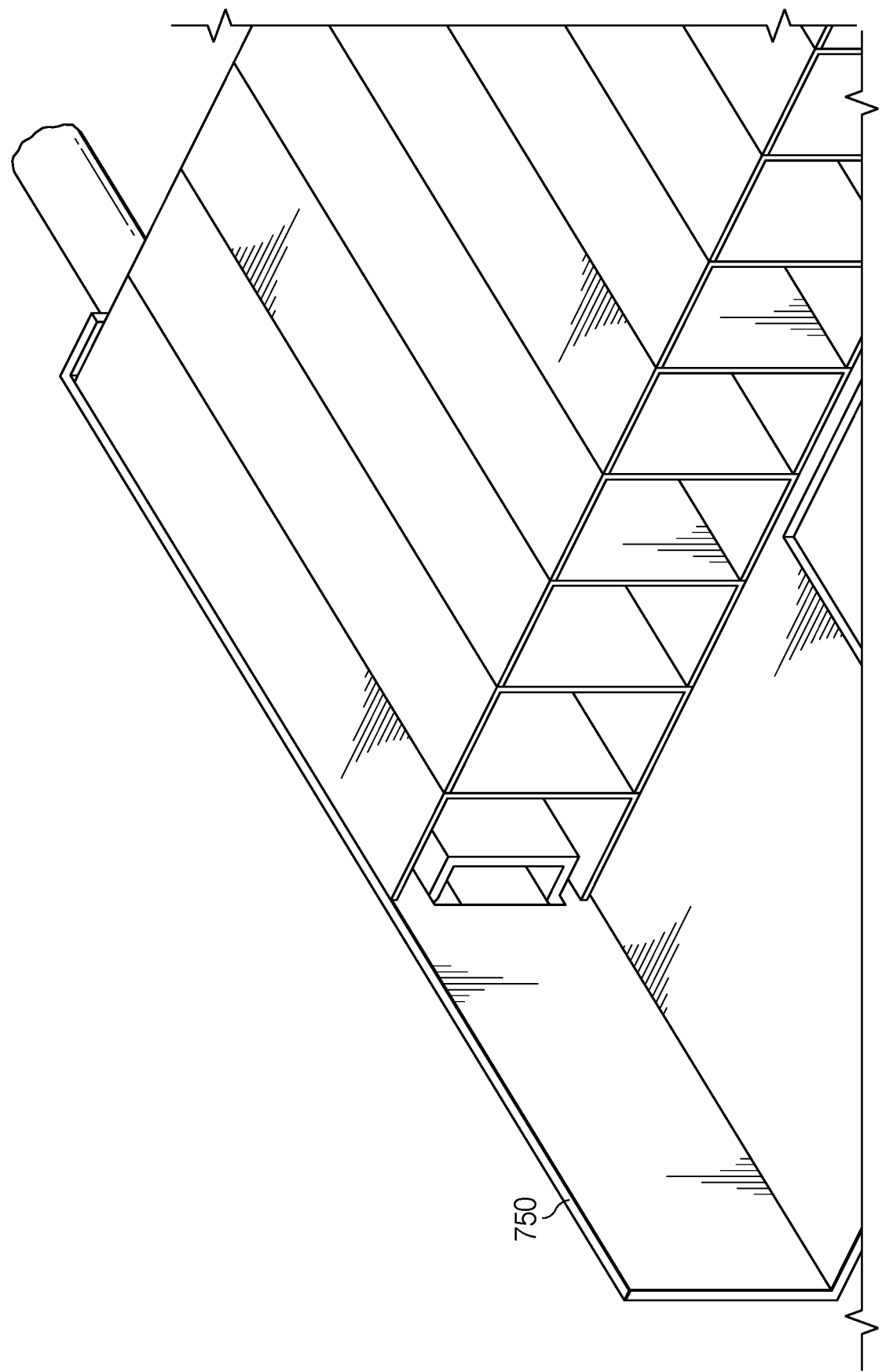
Figure 7C:
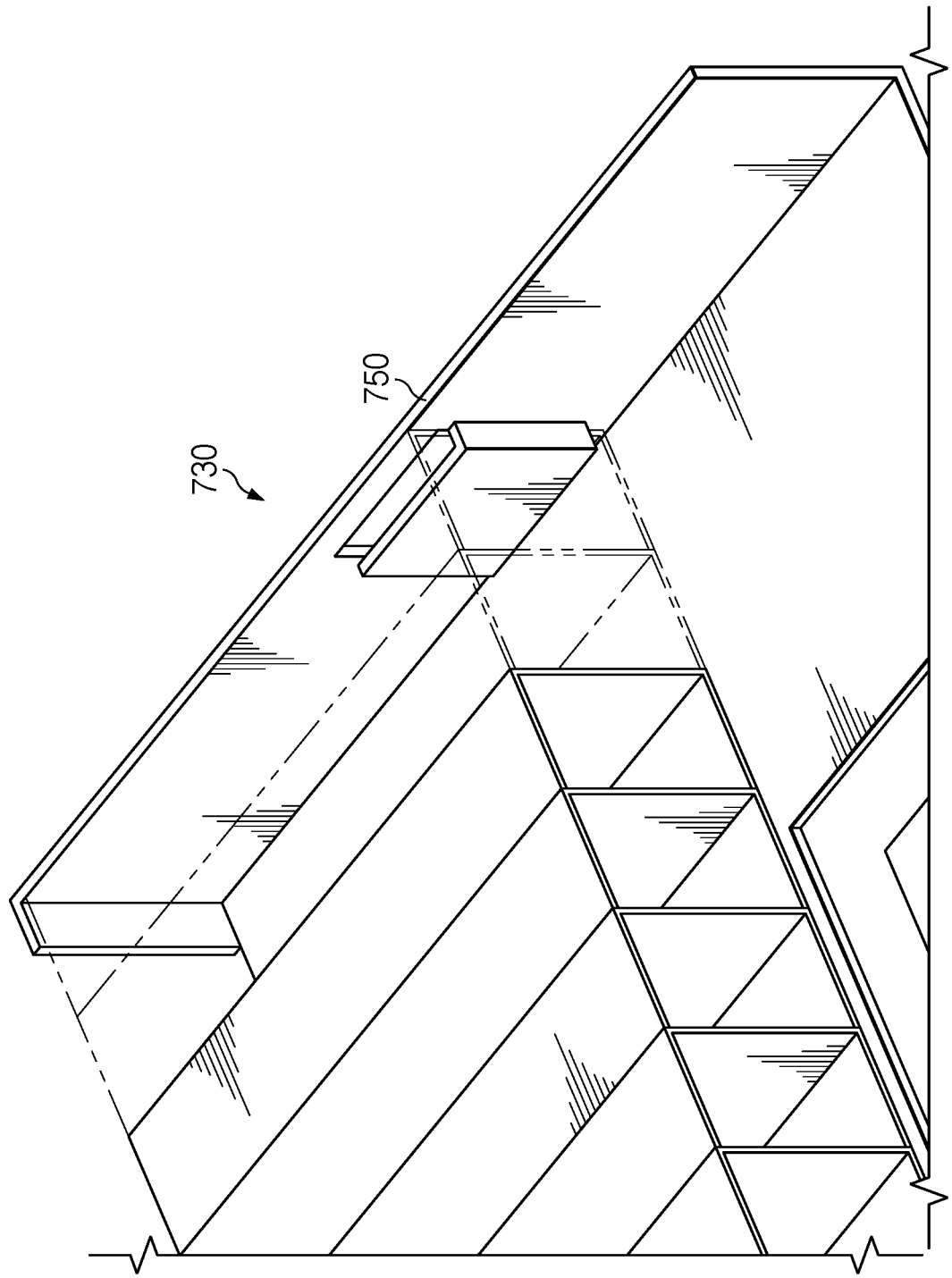

FIG. 6 shows a bottom perspective view of a portion of a thermal module antenna system. FIGS. 7A, 7B and 7C show views of an antenna component 710 fastened to a thermal fin system 720 of a thermal module antenna system 700.

In certain embodiments, antenna cable routing 610 is integrated within the thermal module antenna system. In certain embodiments, the thermal module antenna system 150 includes indentations to guide the cable 620, feed welding and reduce the Z-stacking after soldering. In certain embodiments, the indentations are positioned along a side 630 of the thermal fin system as well as along a bottom portion 632 of the antenna component.

In certain embodiments, the antenna component 710 includes a slide fasten mechanism 730 which allows toolless attachment of the antenna component 710 to the thermal fin system 710. In certain embodiments, the attachment is accomplished by sliding the antenna component such that the sides of the antenna component 710 mate with the exterior sides of the thermal fin section 720. In certain embodiments, the antenna component 710 provides a thermal module subassembly (thermal-antenna) with more stiffness. In certain embodiments, increasing the stiffness of the thermal module antenna system 700 facilitates shipping of the information handling system.

In certain embodiments, side walls 750 of the antenna component along with thermal fins guide hot air flow to bring heat out of the system and to extend the venting path to the edge of the device. Such a design advantageously reduces unnecessary disturbance in the air flow exiting system.

Figure 9:
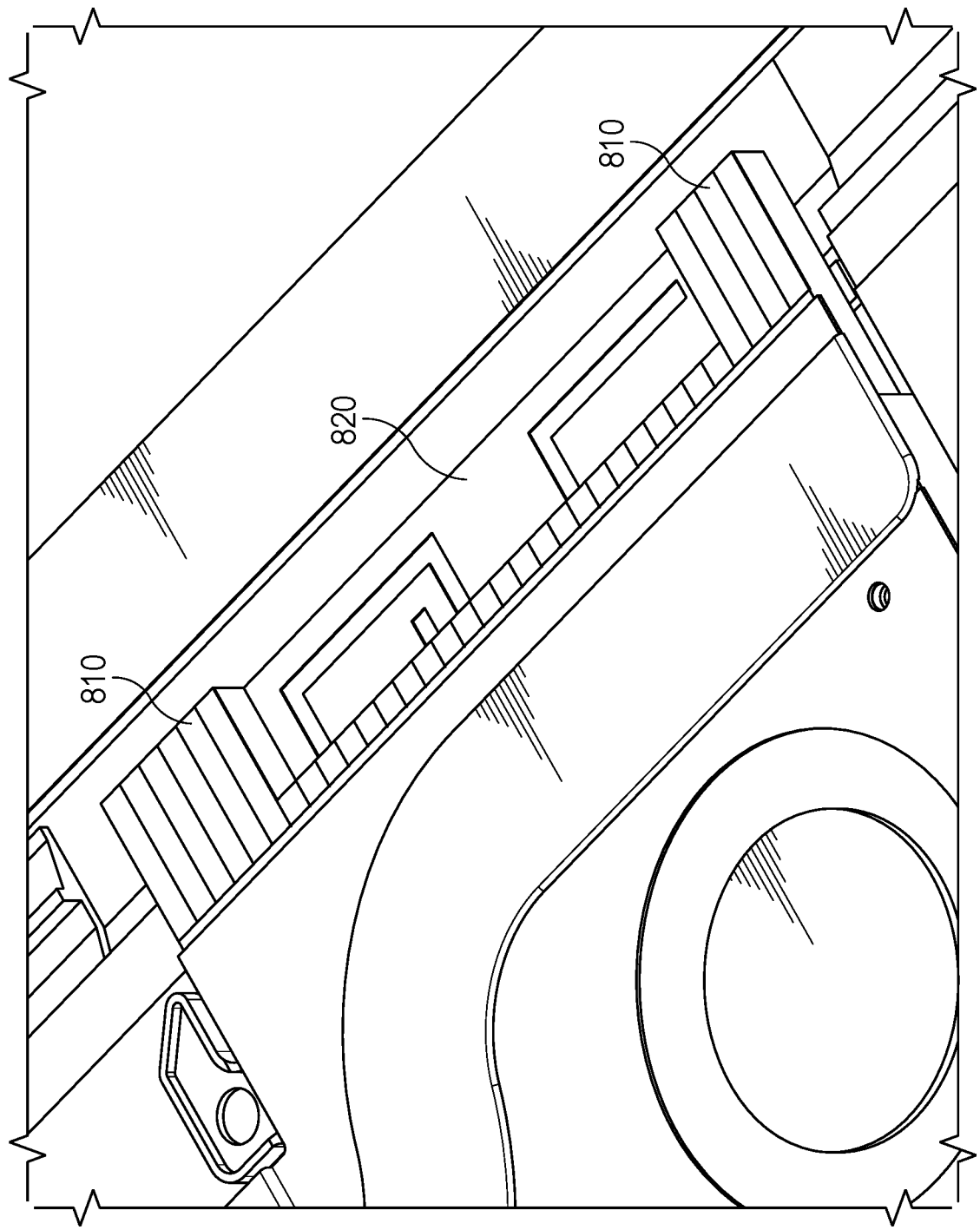
FIG. 9 shows a top perspective view of thermal module antenna system within a portion of a main housing portion of a portable information handling system.
Figure 10:
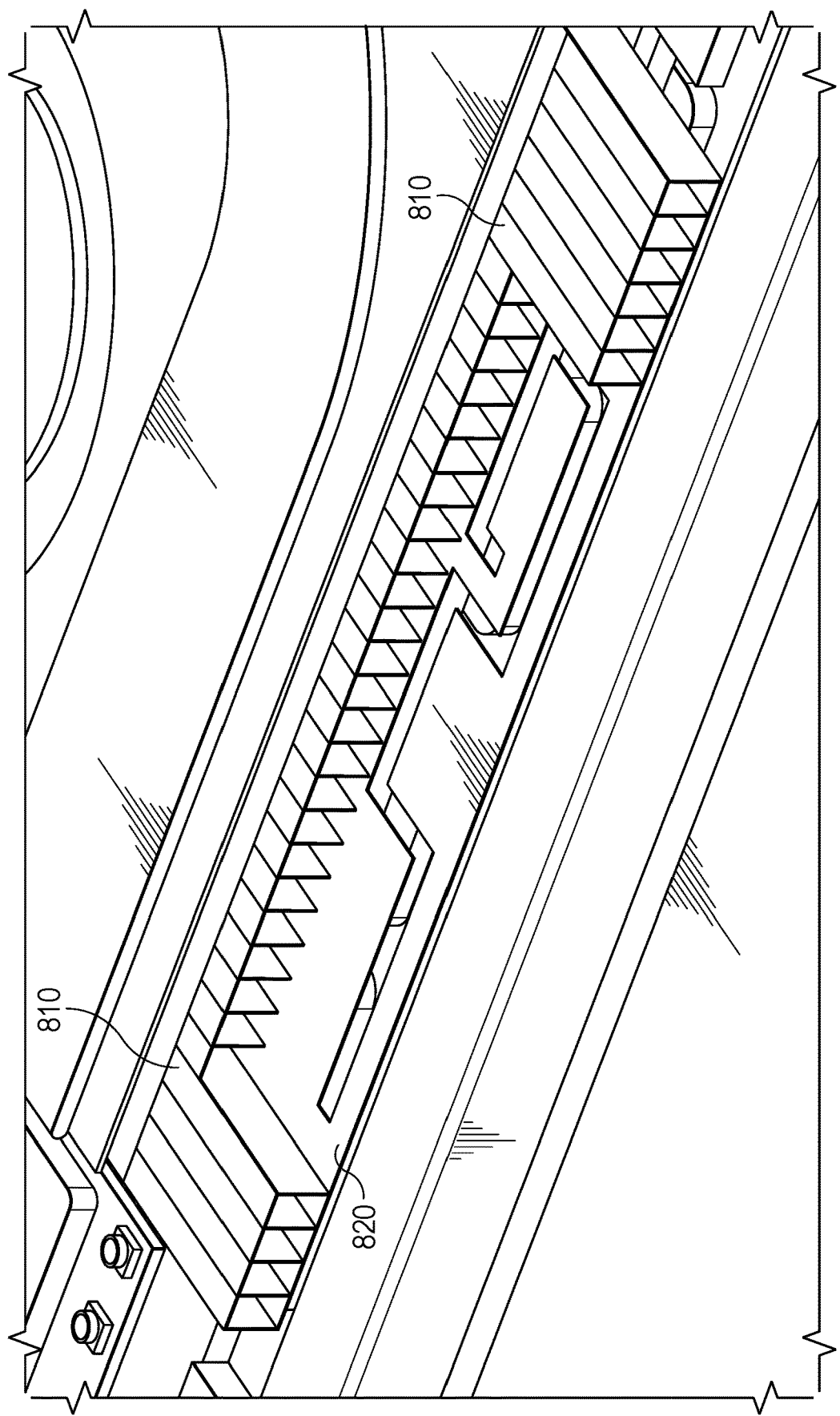
FIG. 10 shows a top perspective view of thermal module antenna system within a portion of a main housing portion of a portable information handling system.

FIG. 8 shows a bottom view of a thermal module antenna system. FIG. 9 shows a top perspective view of thermal module antenna system within a portion of a main housing portion of a portable information handling system. FIG. 10 shows a top perspective view of thermal module antenna system within a portion of a main housing portion of a portable information handling system.

In certain embodiments, the extended fin section 810 is positioned on the sides of the antenna component 820 to allow for antenna pattern design through irregular shaped openings for slot antenna concepts. In certain embodiments, various antenna types can be used as part of the antenna component 820. In certain embodiments, side walls of the antenna component along with fin section 810 positioned on the sides of the thermal component guide hot air flow to bring heat out of the system and to extend the venting path to the edge of the device.

Figure 11A:
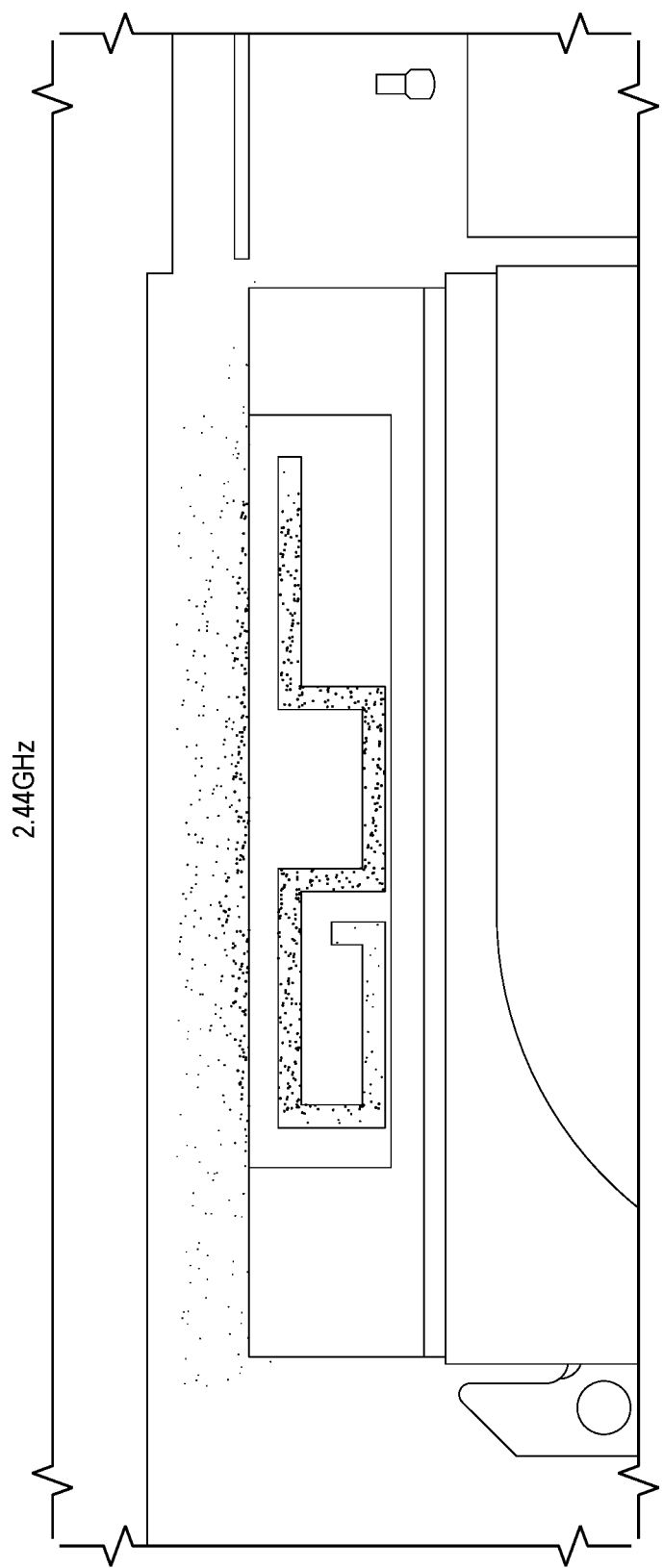
FIGS. 11A, 11B, 11C and 11D show example E field distributions for a thermal module antenna system of portable information handling system.
Figure 11B:
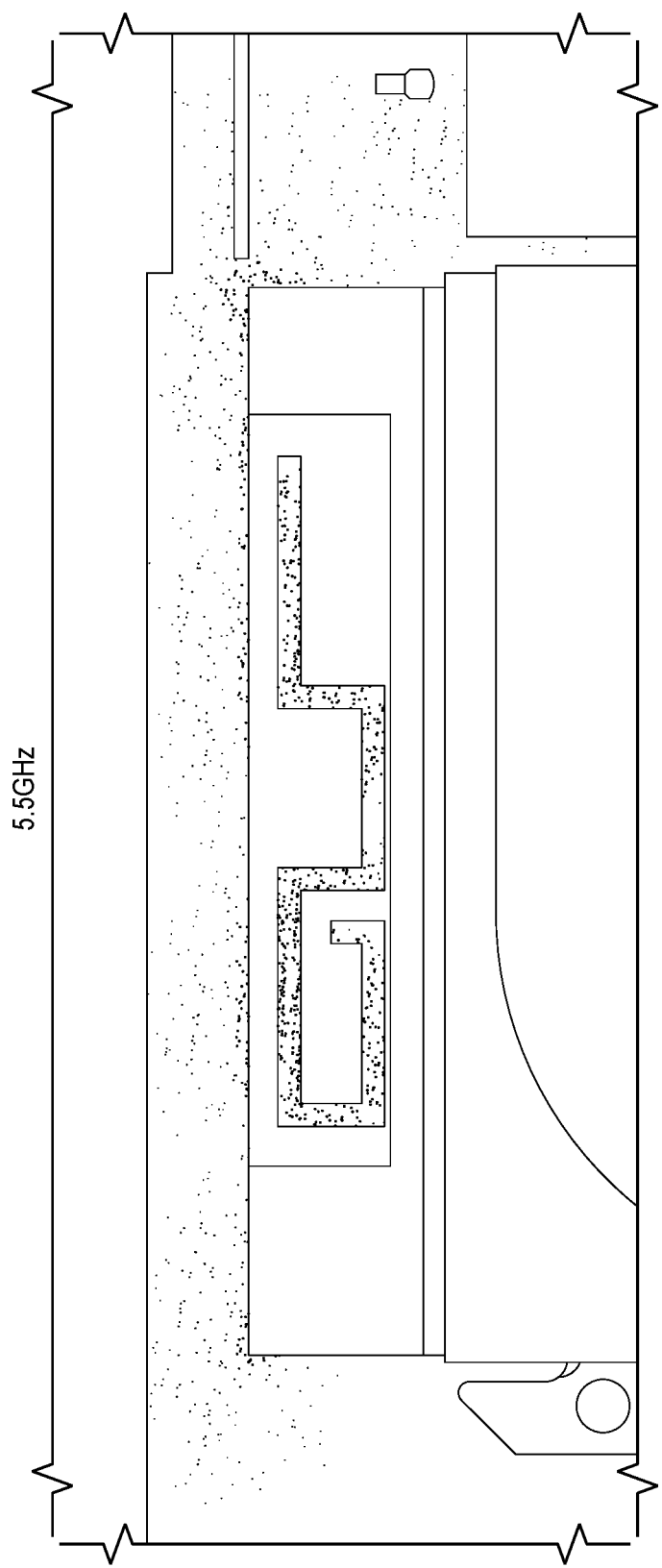
Figure 11C:
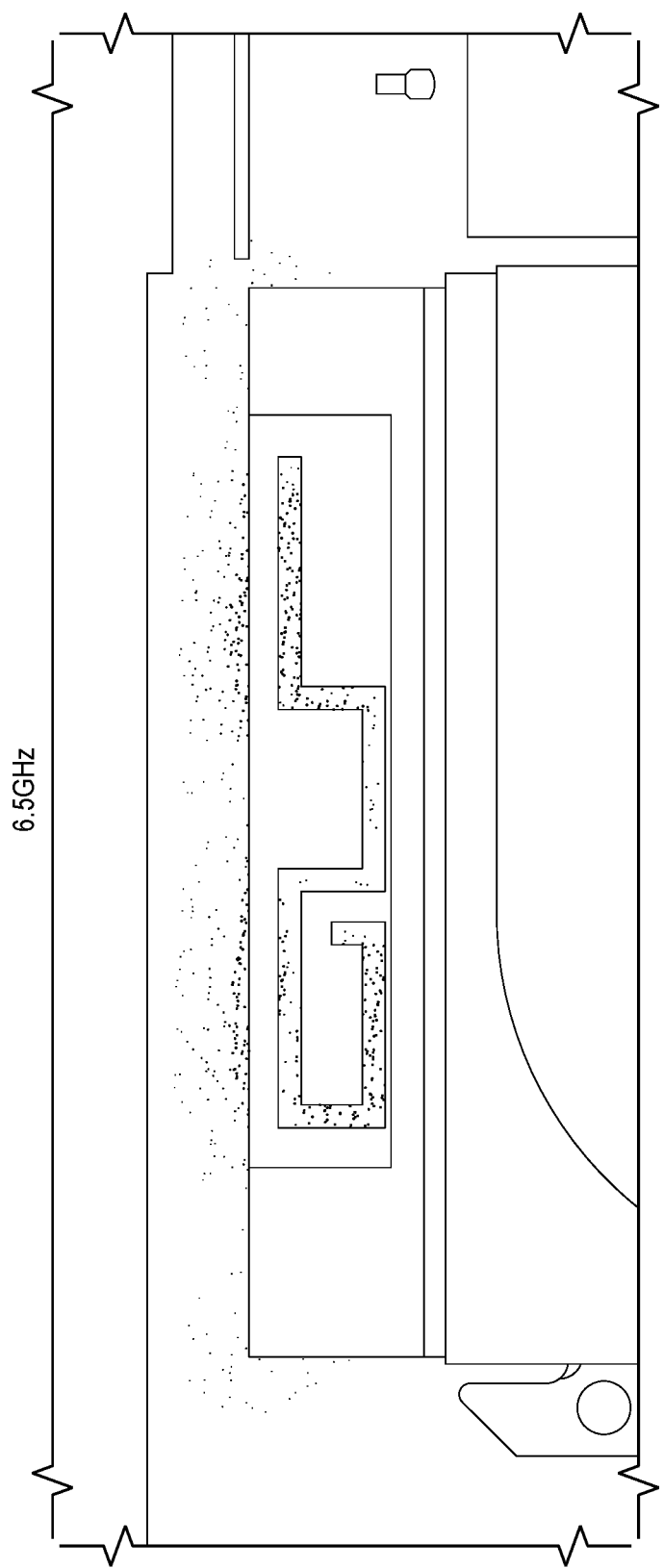
Figure 11D:
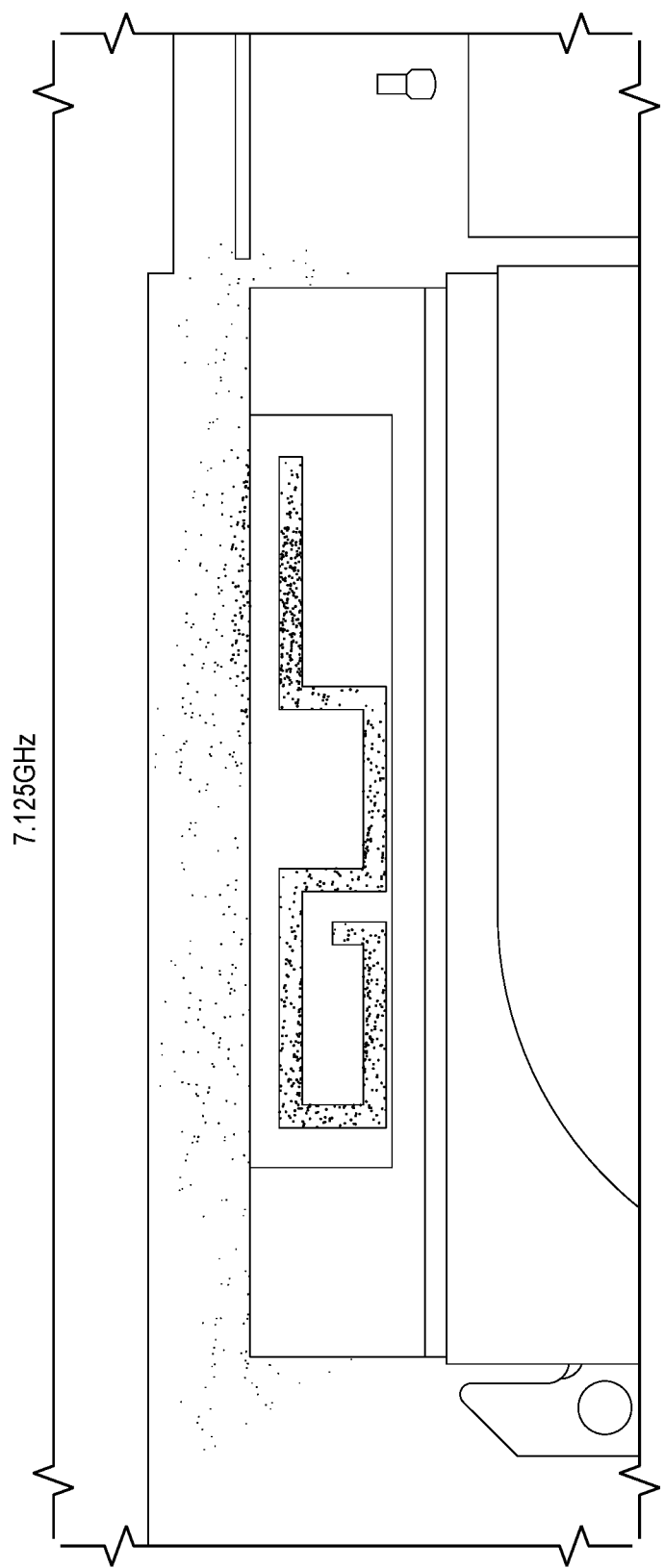

FIGS. 11A, 111B, 11C and 11D show example E field distributions for a thermal module antenna system of a portable information handling system across a plurality of example frequencies. More specifically, FIG. 11A shows example E field distributions across an example frequency of substantially (i.e., +/−20%) 2.44 GHz. FIG. 11B shows example E field distributions across an example frequency of substantially (i.e., +/−20%) 5.5 GHz. FIG. 11C shows example E field distributions across an example frequency of substantially (i.e., +/−20%) 6.5 GHz. FIG. 11D shows example E field distributions across an example frequency of substantially (i.e., +/−20%) 7.125 GHz.

Figure 12A:
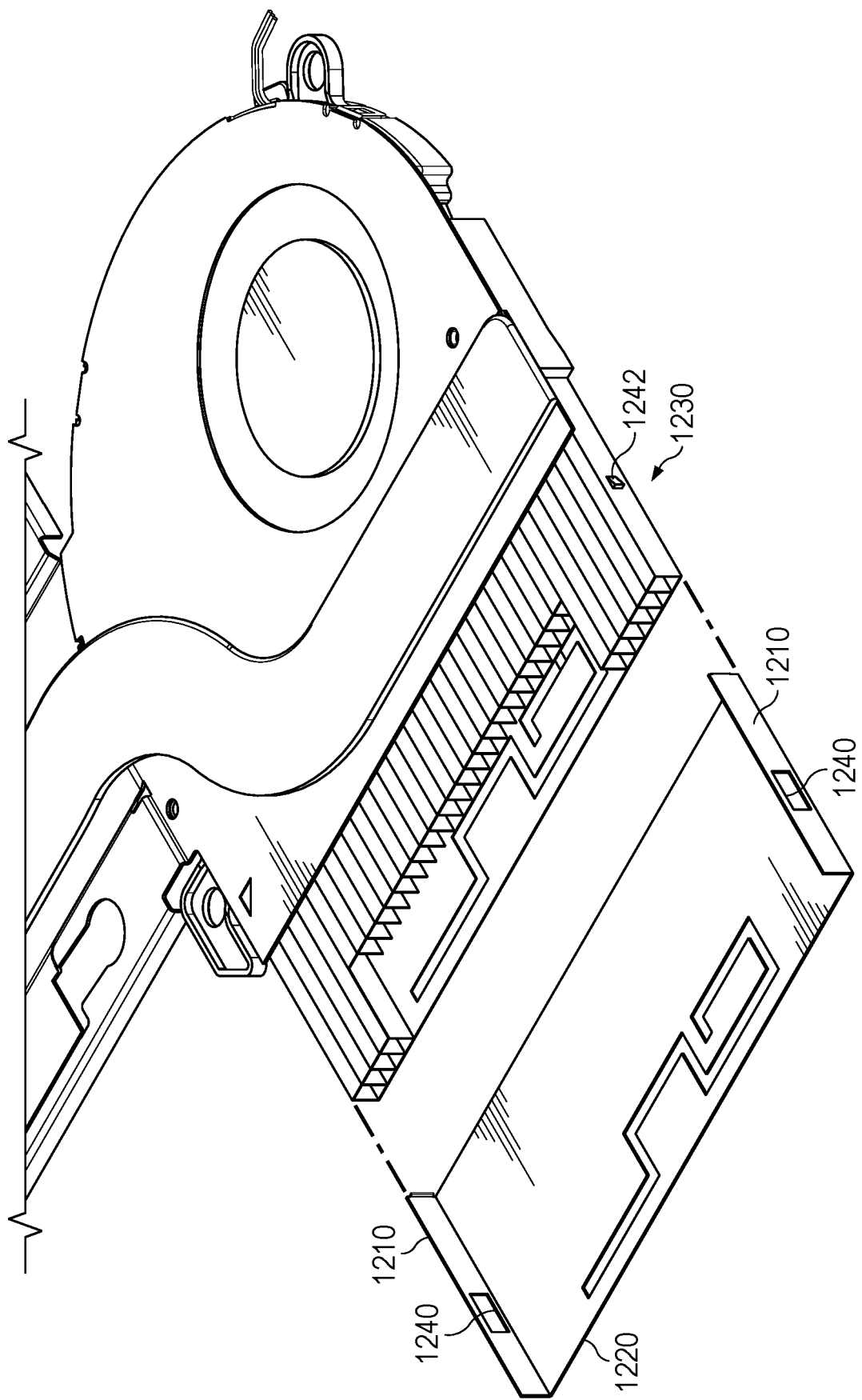
FIGS. 12A, 12B and 12C show views of an antenna component fastened to a thermal fin system of a thermal module antenna system.
Figure 12B:
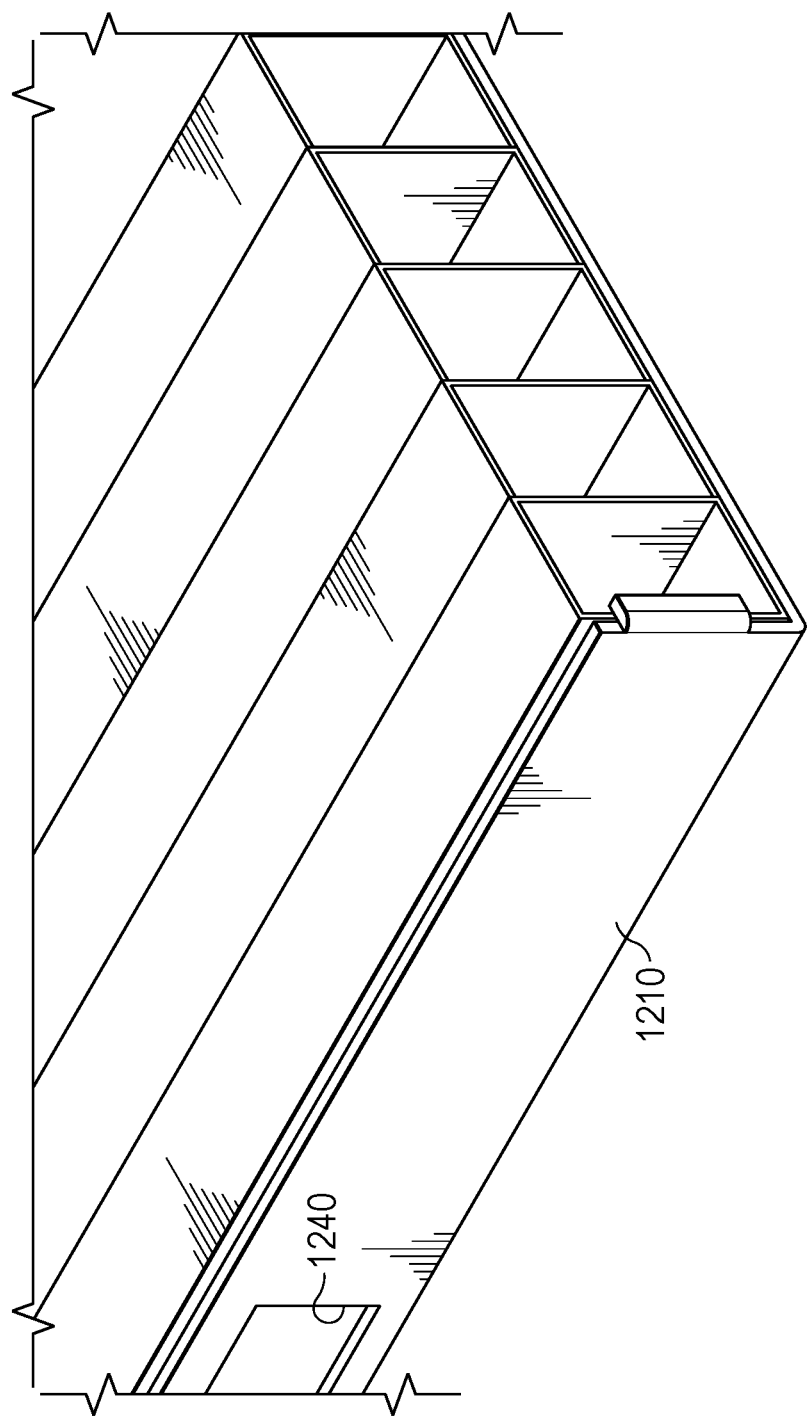
Figure 12C:
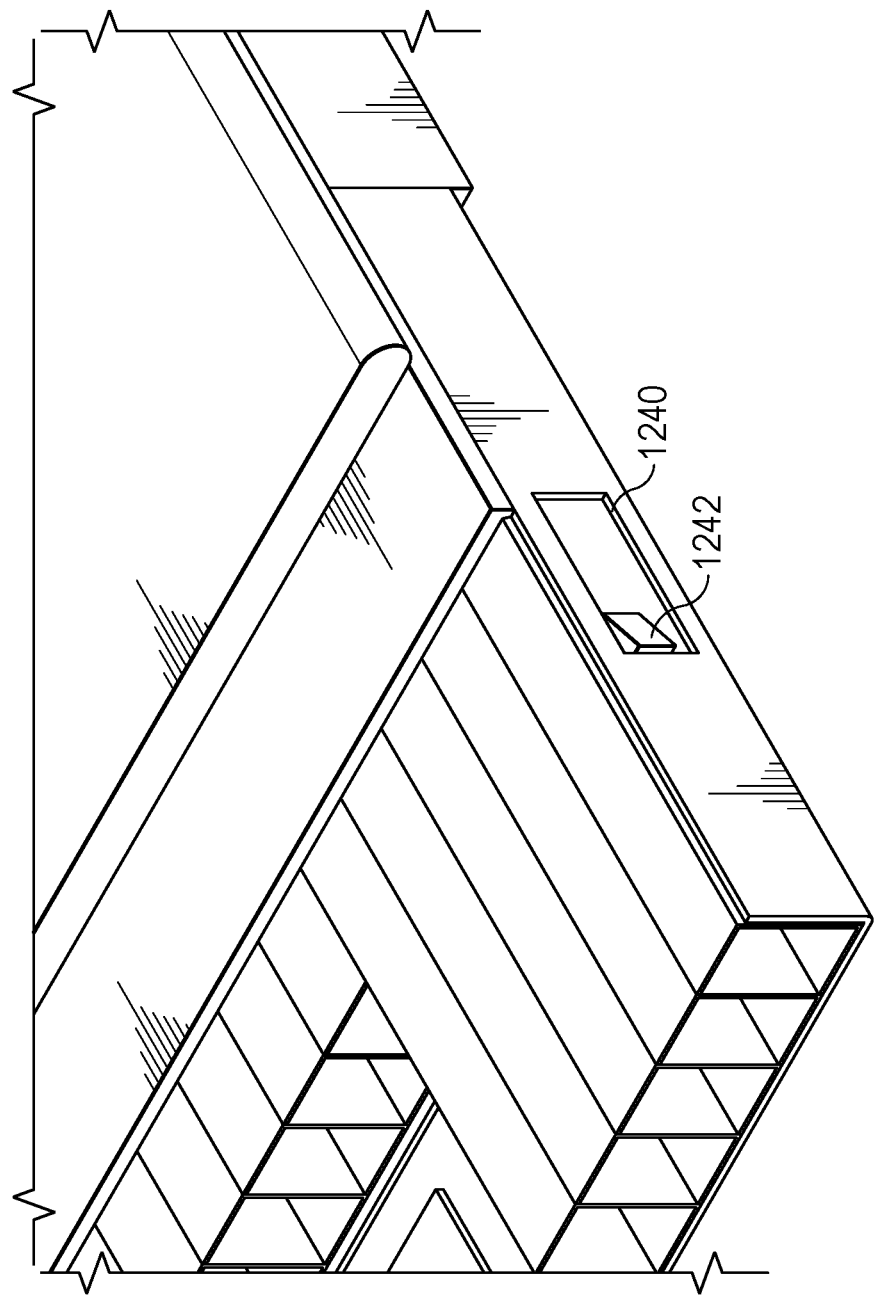

FIGS. 12A, 12B and 12C show views of an antenna component fastened to a thermal fin system of a thermal module antenna system. In certain embodiments, the thermal module antenna solution includes a slide fasten mechanism 1210 which allows tool-less attachment of the antenna component 1220 to the thermal component 1230. In certain embodiments, the slide fasten mechanism 1210 includes apertures 1240 defined by the sides of the antenna component 1210 which mate with projections 1242 extending from the sides of the fin portions of the thermal component 1230. In certain embodiments, the antenna component provides a thermal module subassembly (thermal-antenna) with more stiffness. In certain embodiments, increasing the stiffness of the thermal module antenna solution facilitates shipping of the information handling system.

FIG. 13 shows a top perspective view of a shielding cover used in combination with a thermal module antenna system of an information handling system. In certain embodiments, the shielding cover 1310 includes an antenna 1320. In certain embodiments, the shielding cover utilizes the existing material and combines antenna pattern to provide a multi-function component. In certain embodiments, the shielding cover improves thermal performance by extending the thermal area via which heat is dissipated. In certain embodiments, the shielding cover 1310 is positioned adjacent to the thermal module antenna system. In certain embodiments, the shielding cover 1310 is positioned between a pair of thermal module antenna systems of a portable information handling system. In certain embodiments, the shielding cover 1310 is positioned towards the rear of a base chassis portion of a portable information handling system. In certain embodiments, the shielding cover 1310 extends substantially (i.e., +/−20%) to the same depth as the thermal fins of the thermal module antenna system. In certain embodiments, a rear wall of the shielding cover 1310 extends substantially (i.e., +/−20%) parallel with a rear wall of an antenna component of the thermal module antenna system of the information handling system.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A thermal module antenna system for a portable information handling system, comprising:
   a thermal component, the thermal component performing an information handling system thermal operation, the thermal component including an indented middle thermal portion and a side thermal portion; and,
   an antenna component thermally coupled to the thermal component, the antenna component performing an antenna operation and a thermal dissipation operation, the antenna component including an antenna, the antenna fitting within a rectangle defined by an edge of the indented middle thermal portion of the thermal component and an interior edge of the side thermal portion of the thermal component; and wherein
   the thermal component comprises a thermal fin section, the thermal fin section comprising a plurality of thermal fins;
   the thermal fin section includes an extended side thermal fin portion and an indented middle fin portion;
   the antenna fits within a rectangle defined by an interior edge of the extended side thermal fin portion and a side of the indented middle fin portion; and
   air flow exiting from the extended side thermal fin portion exits along an outside edge of the antenna component and air flow exiting from the indented middle fin portion travels across the antenna.

2. The thermal module antenna system of claim 1, wherein:
   the antenna component extends across the thermal fin section.

3. The thermal module antenna system of claim 1, wherein:
   the antenna component includes a planar type of antenna.

4. An information handling system comprising:
   a processor;
   a data bus coupled to the processor; and
   an information handling system chassis housing, the chassis housing comprising a base chassis, the base chassis comprising a thermal module antenna system, the thermal component antenna system comprising
      a thermal component, the thermal component performing an information handling system thermal operation, the thermal component including an indented middle thermal portion and a side thermal portion; and,
      an antenna component thermally coupled to the thermal component, the antenna component performing an antenna operation and a thermal dissipation operation, the antenna component including an antenna, the antenna fitting within a rectangle defined by an edge of the indented middle thermal portion of the thermal component and an interior edge of the side thermal portion of the thermal component; and wherein
   the thermal component comprises a thermal fin section, the thermal fin section comprising a plurality of thermal fins;
   the thermal fin section includes an extended side thermal fin portion and an indented middle fin portion;
   the antenna fits within a rectangle defined by an interior edge of the extended side thermal fin portion and a side of the indented middle fin portion; and,
   air flow exiting from the extended side thermal fin portion exits along an outside edge of the antenna component and air flow exiting from the indented middle fin portion travels across the antenna.

5. The information handling system of claim 4, wherein:
   the antenna component extends across the thermal fin section.

6. The information handling system of claim 4, wherein:
   the antenna component includes a planar type of antenna.

7. The information handling system of claim 4, wherein:
   the base chassis further includes a shielding cover positioned adjacent to the thermal module antenna system.

8. The information handling system of claim 7, wherein:
   the shielding cover comprises an antenna.

* * * * *